(12) United States Patent
Eatough (10) Patent No.: US 7,356,578 B1
(45) Date of Patent: Apr. 8, 2008

(54) SYSTEM FOR CONSTRUCTING A NETWORK SPANNING TREE USING COMMUNICATION METRICS DISCOVERED BY MULTICAST ALIAS DOMAINS

(75) Inventor: David A. Eatough, Herriman, UT (US)

(73) Assignee: LANDesk Software Limited, Dublin (IE)

( * ) Notice: Subject to any disclaimer, the term of this patent is extended or adjusted under 35 U.S.C. 154(b) by 890 days.

(21) Appl. No.: 10/446,308

(22) Filed: May 28, 2003

(51) Int. Cl.
*G06F 15/173* (2006.01)

(52) U.S. Cl. ............... 709/223; 709/224; 709/238; 709/242

(58) Field of Classification Search ........... 709/249, 709/252, 238, 241, 223, 224, 242; 370/400, 370/393, 328, 432, 408, 390; 707/2
See application file for complete search history.

(56) References Cited

U.S. PATENT DOCUMENTS

| | | | | |
|---|---|---|---|---|
| 5,404,451 | A * | 4/1995 | Nemirovsky et al. | 709/241 |
| 6,105,018 | A * | 8/2000 | Demers et al. | 707/2 |
| 6,310,883 | B1 * | 10/2001 | Mann et al. | 370/408 |
| 6,331,983 | B1 * | 12/2001 | Haggerty et al. | 370/400 |
| 6,370,142 | B1 * | 4/2002 | Pitcher et al. | 370/390 |
| 6,647,020 | B1 * | 11/2003 | Maher et al. | 370/432 |
| 6,728,777 | B1 * | 4/2004 | Lee et al. | 709/238 |
| 6,847,620 | B1 * | 1/2005 | Meier | 370/328 |
| 2003/0039215 | A1 | 2/2003 | Eatough et al. | |
| 2003/0088696 | A1 * | 5/2003 | McCanne | 709/238 |
| 2003/0165140 | A1 * | 9/2003 | Tang et al. | 370/393 |
| 2003/0193958 | A1 * | 10/2003 | Narayanan | 370/400 |

OTHER PUBLICATIONS

"Greedy Algorithms," http://www.cs.man.as.uk/~graham/cs2022/greedy/index.html, pp. 1-2, Jul. 8, 2003.
"Minimum Spanning Tree Demonstration Program," http://www.cs.oregonstate.edu/~minoura/cs261/javaProgs/minST/MinST.html, pp. 1-2, Jul. 8, 2003.
"10 Graphs," http://ciips.ee.uwa.edu.au/~morris/Year2/PLDS210/mst.html, pp. 1-5, Jul. 8, 2003.
ICS 161: Design and Analysis of Algorithms Lecture Notes for Feb. 6, 1996, Http://www.ics.uci.edu/~eppstein/161/960206.html, pp. 1-5, Jul. 8, 2003.

* cited by examiner

*Primary Examiner*—Le Hien Luu
(74) *Attorney, Agent, or Firm*—Madson & Austin (57) ABSTRACT

A system for determining a spanning tree for a computer network is disclosed. The system includes a computing device and a computer-readable medium. The computer-readable medium is part of the computing device or is in electronic communication with the computing device. The computer-readable medium comprises executable instructions for implementing a method for determining the spanning tree for the computer network. Multicast alias domains from the computer network are discovered. The discovery of communication metrics by the multicast alias domains is coordinated. The communication metrics from the multicast alias domains are determined. A minimum spanning tree for the computer network is constructed by using the communication metrics. The minimum spanning tree is stored and used in computer system administration.

22 Claims, 8 Drawing Sheets

SYSTEM FOR CONSTRUCTING A NETWORK SPANNING TREE USING COMMUNICATION METRICS DISCOVERED BY MULTICAST ALIAS DOMAINS

TECHNICAL FIELD

The present invention relates generally to computer system administration. More specifically, the present invention relates to systems and methods for discovering network spanning trees using alias domains.

BACKGROUND

Computer and communication technologies continue to advance at a rapid pace. Indeed, computer and communication technologies are involved in many aspects of a person's day. For example, many devices being used today have a small computer inside of the device. These small computers come in varying sizes and degrees of sophistication. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software is continually being integrated into systems across the world.

Installing new computer hardware and/or software, or problems with existing systems, may cause down-time during which the business or individual operate at diminished levels or are otherwise unable to use the computers as they typically do. Most individuals and businesses try to minimize computer problems so as to avoid down-time.

When a business or individual is trying to decide whether to make a change to a computer system, the concern about down-time may outweigh the cost of the installation or change in influencing the decision. The professional computer service industry which carries out and supports installations and upgrades has been rapidly expanding. However, even with such computer professional support, the threat of such down-time coupled with the costs of such professional services is a concern.

As corporate performance and end-user productivity have become increasingly dependent on computers, computer support personnel are continuously under pressure to accomplish more with existing or reduced staff head counts. They are also under pressure to perform tasks as efficiently as possible which may include minimizing effects to existing computer systems and networks.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

A method for determining a spanning tree for a computer network is disclosed. Multicast alias domains from the computer network are used. Communication metrics from the multicast alias domains are determined. A spanning tree for the computer network is constructed by using the communication metrics.

In certain embodiments of the method, the multicast alias domains may be discovered from the computer network. In addition, the method may coordinate discovery of the communication metrics by the multicast alias domains. The communication metrics may include hop counts.

An iterative algorithm may be used in constructing the spanning tree for the computer network. Various types of algorithms may be used. For example, the iterative algorithm may include a modified Kruskal's algorithm. In some embodiments the spanning tree is a minimum spanning tree.

The spanning tree may be stored. Typically the spanning tree is used in computer system administration. Computer system administration may include many different tasks including, but not limited to, transferring a file over the computer network, transferring data over the computer network, presenting a graphical representation of the computer network, analyzing the computer network and performing software updates.

The method for determining a spanning tree for a computer network may be stored on a computer-readable medium for storing program data. The program data includes executable instructions for implementing the method in a computing device.

A system for determining a spanning tree for a computer network is also disclosed. The system includes a computing device. A computer-readable medium is also included that is part of the computing device or in electronic communication with the computing device. The computer-readable medium includes executable instructions for implementing a method for determining the spanning tree for the computer network. Domains from the computer network are discovered. The method coordinates discovery of communication metrics by the domains. Communication metrics from the domains are determined. A minimum spanning tree for the computer network is constructed by using the communication metrics. The minimum spanning tree is stored and used in computer system administration.

Bandwidth characterizing technologies may be used to determine link types in the computer network.

The domains may be different types of domains. For example, the domains may include multicast alias domains. In addition, the domains may include multipoint communication domains. The domains may also include broadcast domains.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order unless explicitly stated herein.

Although the embodiments herein are described with reference to multicast jobs, they may be applied to broadcast jobs, point to multipoint, and multipoint to multipoint jobs as well.

Figure 1:
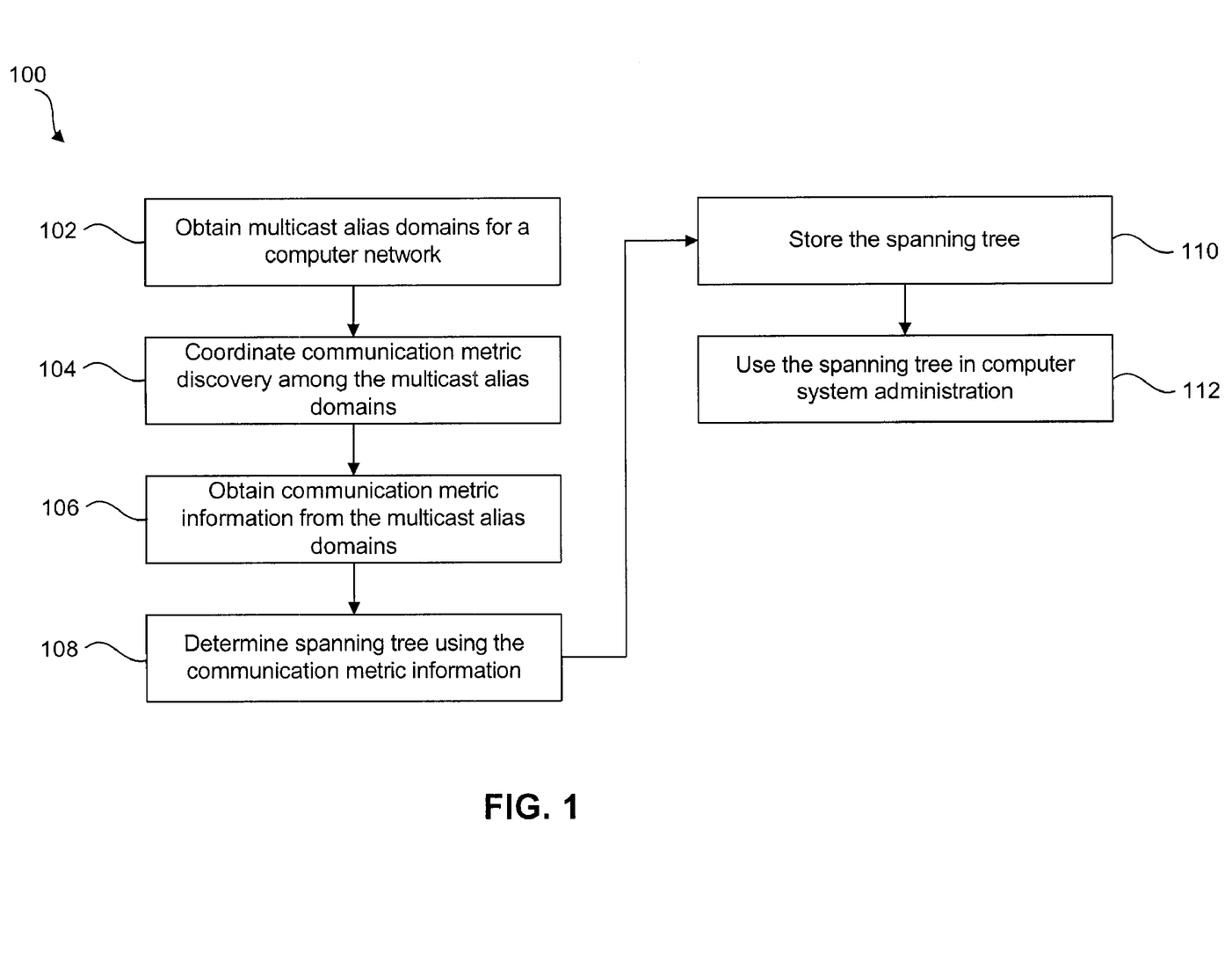
FIG. 1 is a general flow diagram of a method for determining a spanning tree for a computer network.

FIG. 1 is a general flow diagram 100 of a method for determining a spanning tree for a computer network. In an embodiment of this method discussed below it may be a minimum spanning tree. This method provides a method for arranging a set of network nodes into a spanning tree (which may be, in one embodiment, a minimum spanning tree).

Multicast alias domains are obtained 102 for a computer network. The definition of a multicast alias domain and ways in which it may be obtained are discussed below. Then the discovery of a communication metric is coordinated 104 among the multicast alias domains. Information relating to the communication metric is then obtained 106 from the multicast alias domains.

The embodiments herein use multicast alias domains. However, these embodiments may also use other multipoint communication domains rather than multicast alias domains. For example, the techniques herein may be used with broadcast domains or any other multipoint communication domains.

A spanning tree is determined 108 through use of the communication metric information. This spanning tree may be determined in a single pass as shown in the diagram, or it may be determined iteratively by obtaining metrics from the multicast alias domains 106 and then checking to see if the spanning tree is complete 108. The spanning tree that has been determined is then stored 110. The spanning tree may then be used 112 in computer system administration. System administrators may use spanning trees for a variety of tasks including, but not limited to, file transfer, data transfer, to present a graphical representation of a computer network through a graphical user interface, for analysis of a computer network, software updates, and the like.

Embodiments of this method may determine the spanning tree using multicast alias domains and hop counts as the weight for edges of the spanning tree. Such an embodiment will be more fully discussed below.

One approach for determining alias domains is described in U.S. patent application Ser. No. 09/927,708, filed Aug. 10, 2001 and entitled "Method and Apparatus for Dynamically Discovering Alias Domains," hereby incorporated by reference in its entirety. A multicast alias domain consists of all computers that can see each other's multicast traffic without crossing a router. Another possible definition is that a multicast domain consists of all machines where the IP hop count between any two computers is zero. Because the hop count between all machines in a multicast domain is zero the arrangement of the machines within the multicast domain does not typically matter. Thus, as shown below, systems and methods may simply determine the hop counts between the various multicast domains.

There are various ways in which multicast domains may be determined. Multicast domains may be discovered, they may be manually configured, they may be read in from a configuration file, etc.

Figure 2:
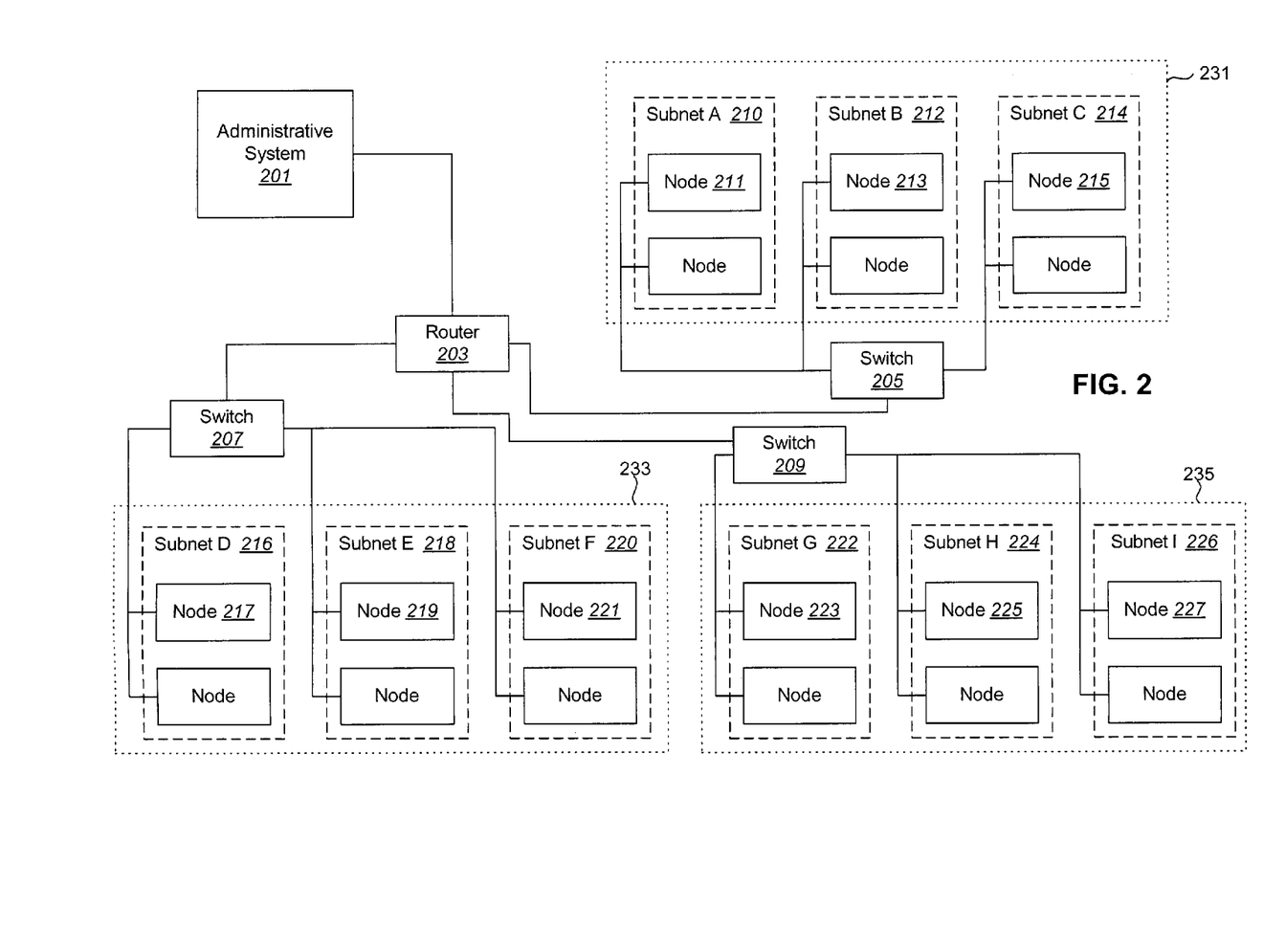
FIG. 2 is an exemplary block diagram illustrating establishment of multicast alias domains.

FIG. 2 is an exemplary block diagram illustrating establishment of multicast alias domains according to one embodiment. In FIG. 2, an administrative system 201 connects to a router 203. The administrative system 201 may be any computer or computing device that has been configured to implement the method as described. For this example, it does not matter if the router 203 forwards multicast traffic or not, since all multicast messages will be sent with a TTL (Time To Live field of the IP packet) of one. With a TTL of one the first device that decrements the TTL, i.e. router 203, will cause the TTL to expire and the packet will not be forwarded. The router 203 may be connected to three switches: a first switch 205, a second switch 207 and a third switch 209. Each switch 205, 207, 209 connects to three subnets. The first switch 205 connects to three subnets 210, 212, and 214. The second switch 207 connects to three subnets 216, 218, and 220. The third switch 209 connects to three subnets 222, 224, and 226. The switches 205, 207, and 209 forward multicast traffic. The network nodes or elements 211, 213, and 215 respectively are the subnet representatives for their respective subnets 210, 212, and 214. The nodes 217, 219, and 221 respectively are the subnet representatives for their subnets 216, 218, and 220. Network nodes 223, 225 and 227 respectively are the subnet representatives for their subnets 222, 224, and 226. In this example, all subnets are configured to receive multicast data. The administrative system 201 determines the subnets to receive the multicast data.

The subnet representatives may be determined in a number of ways. Subnet representatives may be manually selected by an administrator. In addition, a discovery process may be used wherein responses from network nodes are used to select the subnet representative (e.g., the first to respond is selected, the first to respond with a particular configuration is selected, etc.). Those skilled in the art will appreciate the many different ways in which a subnet representative may be determined.

Software and/or hardware on the network nodes may be used to respond to and communicate with the administrative system 201. For example, a process may be executed on each network node that listens for communications from the administrative system 201.

The administrative system 201 will begin discovery of alias domains by selecting one of the subnet representatives 211, 213, 215, 217, 219, 221, 223, 225, or 227. In this example, the administrative system 201 transmits a discovery message to the first subnet representative 211. The first subnet representative 211 searches locally for a job ID (an identifier for a transmission job) indicated in the discovery message, but does not find it. Since the subnet representative 211 does not find the job locally, the subnet representative 211 multicasts a notification message. The notification message indicates the job ID and an address for the subnet A 210. The notification message is transmitted throughout the subnet A 210 and to the switch 205. The switch 205 forwards the notification message to the subnets B 212 and C 214. In this example, subnet B 212 and subnet C 214 have visibility of messages from the subnet representative 211 (i.e., subnet B 212 and subnet C 214 can receive multicast data from the subnet representative 211). All network nodes in subnet A 210, B 212 and C 214 receive the notification message and store the job ID and the address indicated in the notification message. Hence, the subnet representatives 213 and 215 will have the address of subnet A 210 and the job ID locally. The switch 205 also transmits the notification message to the router 203, but the router 203 does not forward the notification message.

The administrative system 201 transmits a discovery message to the subnet representative 217. The subnet representative 217 does not find the job ID of the discovery message locally and multicasts a notification message. The notification message, indicating the job ID and the address for the subnet D 216, is transmitted throughout subnet D 216 and to the switch 207. In this example, subnet E 218 and subnet F 220 have visibility of messages from the subnet representative 217. The switch 207 forwards the notification message to the subnets E 218 and F 220. All machines within the subnet E 218 and the subnet F 220, including the subnet representatives 219 and 221, store the subnet address of subnet D 216 and the job ID locally. The switch 207 also forwards the notification message to the router 203, but the router does not forward the notification message. The subnet representative 217 transmits a response to the administrative system 201 indicating that the subnet representative 217 does not indicate an alias domain (i.e., the subnet representative is unaware of a domain representative).

The administrative system 201 transmits a discovery message to the subnet representative 213. The subnet representative 213 has the job ID indicated in the discovery message stored locally from the notification message that was transmitted from the subnet representative 211. The subnet representative 213 transmits a response to the administrative system 201 indicating the alias domain as subnet A 210. After receiving the response from the subnet representative 213, the administrative system 201 transmits a discovery message addressed to the subnet representative 215. Since the subnet representative 215 also has the job ID indicated in the discovery message stored locally from the notification message that was transmitted from the subnet representative 211. The subnet representative 215 transmits a response to the administrative system 201 also indicating the alias domain as subnet A.

The administrative system 201 continues transmitting the discovery message serially to each subnet representative 219, 221, 223, 225, 227 until transmitting to the last one. After receiving a response from a subnet representative, the administrative system 201 transmits a discovery message to the next subnet representative. In FIG. 2, the example illustrated assumes that the subnet representative 217 becomes the domain representative for the subnet E 218 and the subnet F 220. The example of FIG. 2 also assumes that the subnet representative 223 becomes the domain representative for the subnet G 222, the subnet H 224, and the subnet I 226. In the example illustrated in FIG. 2, the subnet D 216, the subnet E 218, and the subnet F 220 are established as a single alias domain. Also, the subnet G 222, the subnet H 224, and the subnet I 226 are established as an alias domain.

FIG. 2 is an exemplary diagram illustrating the alias domains established according to one embodiment of the method for discovering the alias domains. Once the discovery process has ended and the administrative system 201 has received responses from all the subnet representatives, the administrative system establishes the alias domains. An alias domain ABC 231 includes subnet A 210, subnet B 212, and subnet C 214. An alias domain DEF 233 includes the subnet D 216, the subnet E 218, and the subnet F 220. An alias domain GHI 235 includes the subnet G 222, the subnet H 224, and the subnet I 226.

Figure 3:
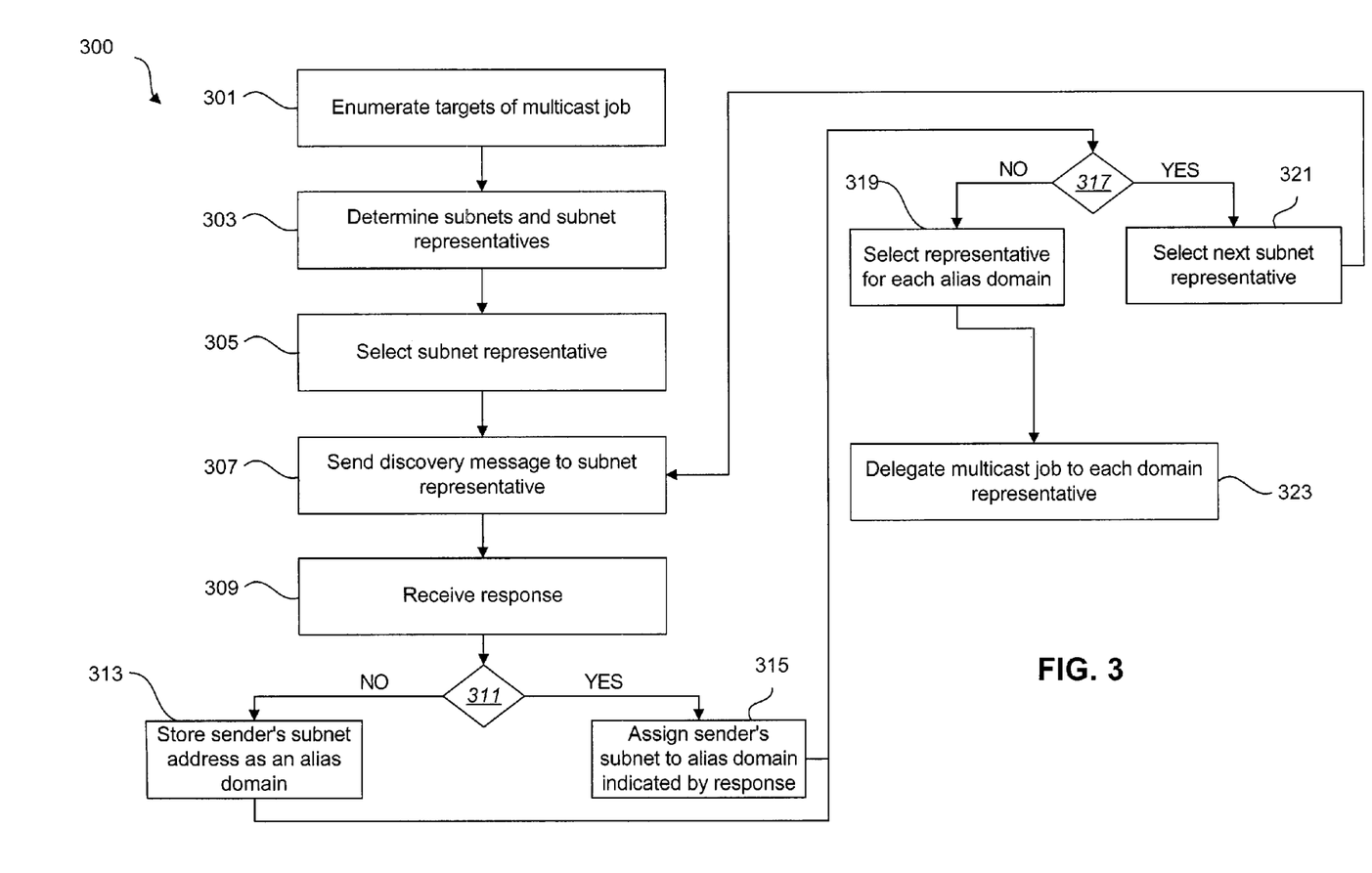
FIG. 3 is a flow chart of one method for dynamically establishing various domains.

FIG. 3 is a flow chart for dynamically establishing various domains according to one embodiment. Targets of a multicast job are enumerated 301, this set of targets may be the set of machines to which a file is to be transmitted or it could be all the machines in a database, an LDAP (Lightweight Directory Access Protocol) directory, an organization unit with an LDAP directory, or any other collection of machines. An administrative system 201 determines 303 the targets' subnets and their subnet representatives. The administrative system 201 then selects 305 one of the subnet representatives. At block 307, a discovery message is sent 307 to the selected subnet representative. The response to the discovery message is received 309 by the administrative system 201.

It is determined 311 if the response indicates an alias domain. If the response does not indicate an alias domain, then the address corresponding to the subnet of the subnet representative is stored 313 as an alias domain. If it is determined that the response indicates an alias domain, then the subnet corresponding to the subnet representative is assigned 315 to the indicated alias domain.

It is determined 317 if there are any other subnets. If there are additional subnets, then the representative for the next subnet is selected 321. From block 321 control flows to block 307, as shown. If there are no more subnets, then a domain representative is selected 319 for each alias domain. The multicast job is delegated 323 to each domain representative. In one embodiment of the method, blocks 319 and 323 may be performed in parallel. In another embodiment of the method, blocks 319 and 323 may be individually performed.

In one embodiment, domain representatives are determined by the network administrator. In another embodiment, the addresses for each potential domain representative are ordered and either the network node or element with the lowest or highest address is selected as the domain representative. In another embodiment, domain representatives are selected from subnet representatives that have file data to be transmitted to the targets. In a still yet further embodiment, the first subnet representative in an alias domain to respond to the discovery message is selected as the domain representative. In a further embodiment, the administrative system 201 selects one of the network nodes contacted during the discovery process as a domain representative. In another embodiment, the administrative system 201 compiles a list of multicast targets for each subnet as potential domain representatives.

A discovery message may be processed in various ways. A subnet representative receives a discovery message from the administrative system 201. As mentioned above, the subnet representative then determines if a job ID indicated in the discovery message is found locally. If the job ID is found locally, then a response is sent to the administrative system 201 indicating an alias domain. If the job ID is not found locally, then the subnet representative multicasts a notification message. Then the subnet representative sends a response to the discovery message to the administrative system 201 not indicating an alias domain.

Figure 4:
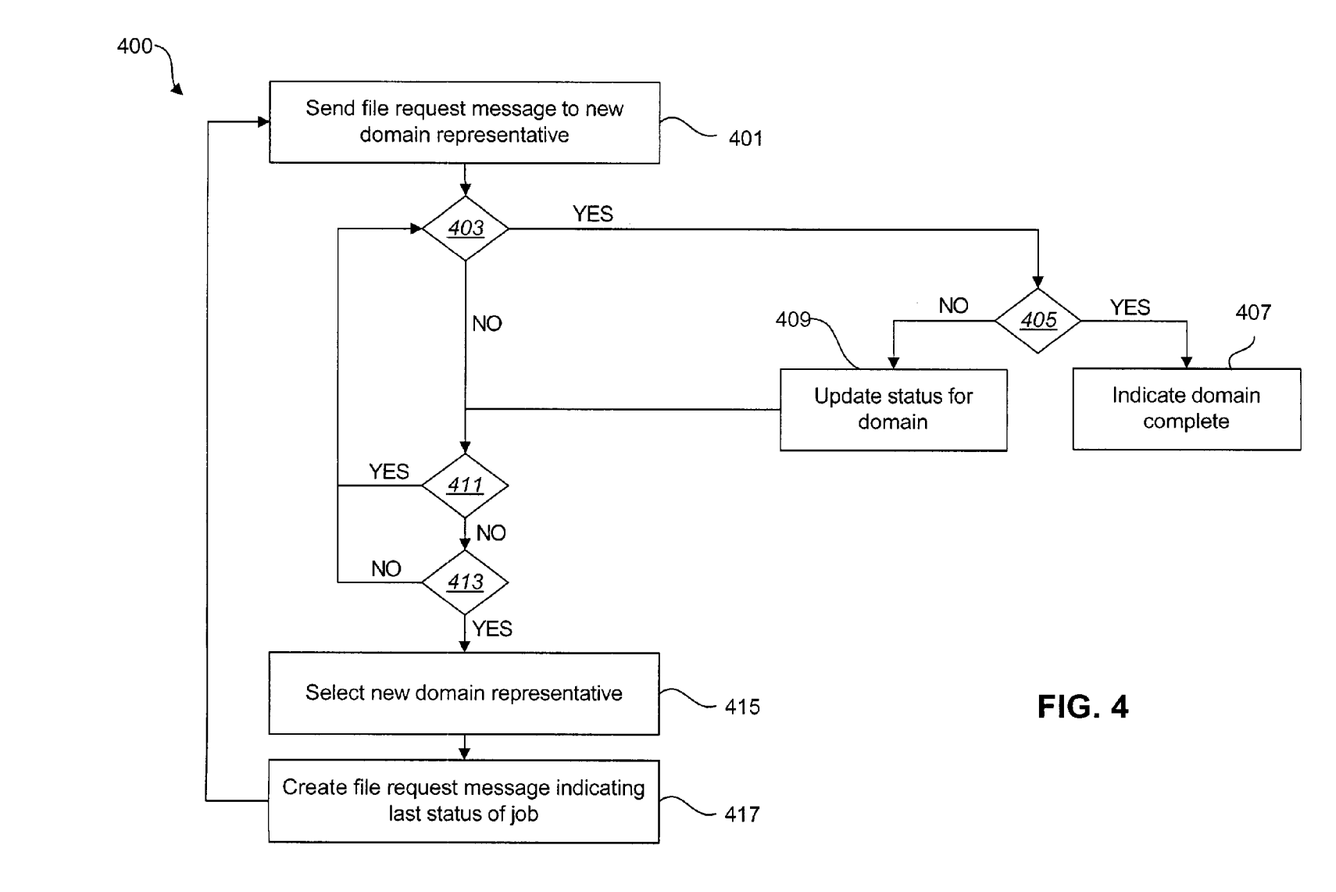
FIG. 4 is a flowchart of one method for the administrative system managing the transmission job for an alias domain.

FIG. 4 is a flowchart for the administrative system managing the transmission job for an alias domain according to one embodiment. The administrative system 201 sends 401 a file request message to a domain representative. Referring to FIG. 2, the administrative system 201 can select any one of the subnet representatives 211, 213, or 215, as the domain representative for alias domain ABC 231 shown in FIG. 2. The administrative system 201 determines 403 if a status message has been received from the domain representative. If a status message has been received from the domain representative, then it is determined 405 if the transmission job has been completed by the domain representative. If the job has been completed by the domain representative, then at block 407 the administrative system 201 indicates that the transmission job has been completed for the given alias domain. If it is determined 405 that the transmission job has not been completed, then at block 409 the administrative system 201 updates 409 the status of the alias domain. From block 409 control may flow to block 411.

If the administrative system 201 determines 403 that the a status message has not been received from the domain representative, then at block 411 the administrative system 201 determines 411 if a heartbeat message has been received from the domain representative. If the administrative system 201 has received a heartbeat message from the domain representative then control flows back to block 403. If the administrative system 201 has not received a heartbeat message from the domain representative then it is determined 413 if a time period for receiving heartbeat messages has expired. If the given time period has not expired, then control flows back to block 403. If the time period has expired, then the administrative system 201 selects 415 a new domain representative. The administrative system 201 creates 417 a file request message indicating the last status of the incomplete transmission job. From block 417 control flows to block 401.

Once the multicast alias domains have been determined, a spanning tree may be determined. There are a number of iterative algorithms that may be used to determine a spanning tree for the computer network. For example, three such algorithms are Kruskal's algorithm, Prim's algorithm and Boruvka's algorithm.

A modified Kruskal's algorithm may be used in discovering a network spanning tree. Kruskal's algorithm is a well known and commonly used algorithm to determine a minimum spanning tree, and is defined as shown in Table 1. The input to the algorithm is a finite weighted connected graph G with edges listed in order of increasing weight. The output from the algorithm is a set E of edges of a minimum spanning tree for G. More details regarding Kruskal's algorithm may be found in various sources including Discrete Mathematics, Third Edition, by Kenneth A. Ross and Charles R. B. Wright.

TABLE 1

| | |
|---|---|
| Set E := Ø | T1.1 |
| For i = 1 to | E(G) | | T1.2 |
| If E U {$e_i$} is acyclic put $e_i$ in E | T1.3 |

In line T1.1 the set of E edges of a minimum spanning tree is set to an empty set. At line T1.2 an index i is set to 1 and a for loop is constructed going from 1 to the number of edges that are in the graph G. The set of edges in G is represented by E(G), and each edge E in E(G) will have a weight associated with it. These weights define how desirable it is to have the edge in the minimum spanning tree. Typically edges with lower weights are considered more desirable than those with higher weights. Additionally the edges in E(G) are processed in sorted order, meaning that it would be more desirable to have $e_1$ in the minimum spanning three than $e_2$. For each edge in the graph G, if E union {$e_i$} is acyclic, then $e_i$ is added to E. It will be appreciated by those skilled in the art that Kruskal's algorithm may be performed in various ways and with different terminology used. The foregoing example is only one possible exemplary set of pseudocode out of many implementing Kruskal's algorithm.

Kruskal's algorithm may be adapted for enabling a determination of the minimum spanning tree using an iterative approach. The adapted algorithm in pseudocode is shown below in Table 2. By using a modification of Kruskal's algorithm the system only needs to determine hop counts as needed. The input to the adapted Kruskal's algorithm is the set of multicast alias domains V which make up the vertices of the graph G. The output is a set E of edges of a minimum spanning tree for G.

TABLE 2

| | |
|---|---|
| Set E := Ø | T2.1 |
| Set i := 1 | T2.2 |
| While E U V does not create a connected graph | T2.3 |
| E(H) = Edges with hop count of i | T2.4 |
| For k = 1 to \| E(H) \| | T2.5 |
| If E U {$e_k$} is acyclic put $e_k$ in E | T2.6 |

This adapted algorithm relies upon the ability to calculate all of the edges that have a particular hop count. This can be accomplished by using the multicast domain representatives. When calculating the hop count for an edge the coordinating system contacts one of the multicast domain representative and asks it to determine if the number of hops between the two multicast domains is the specified value i as shown in TABLE 2. Thus the work of determining the hop count can be divided amongst the individual multicast domain representatives.

Figure 5:
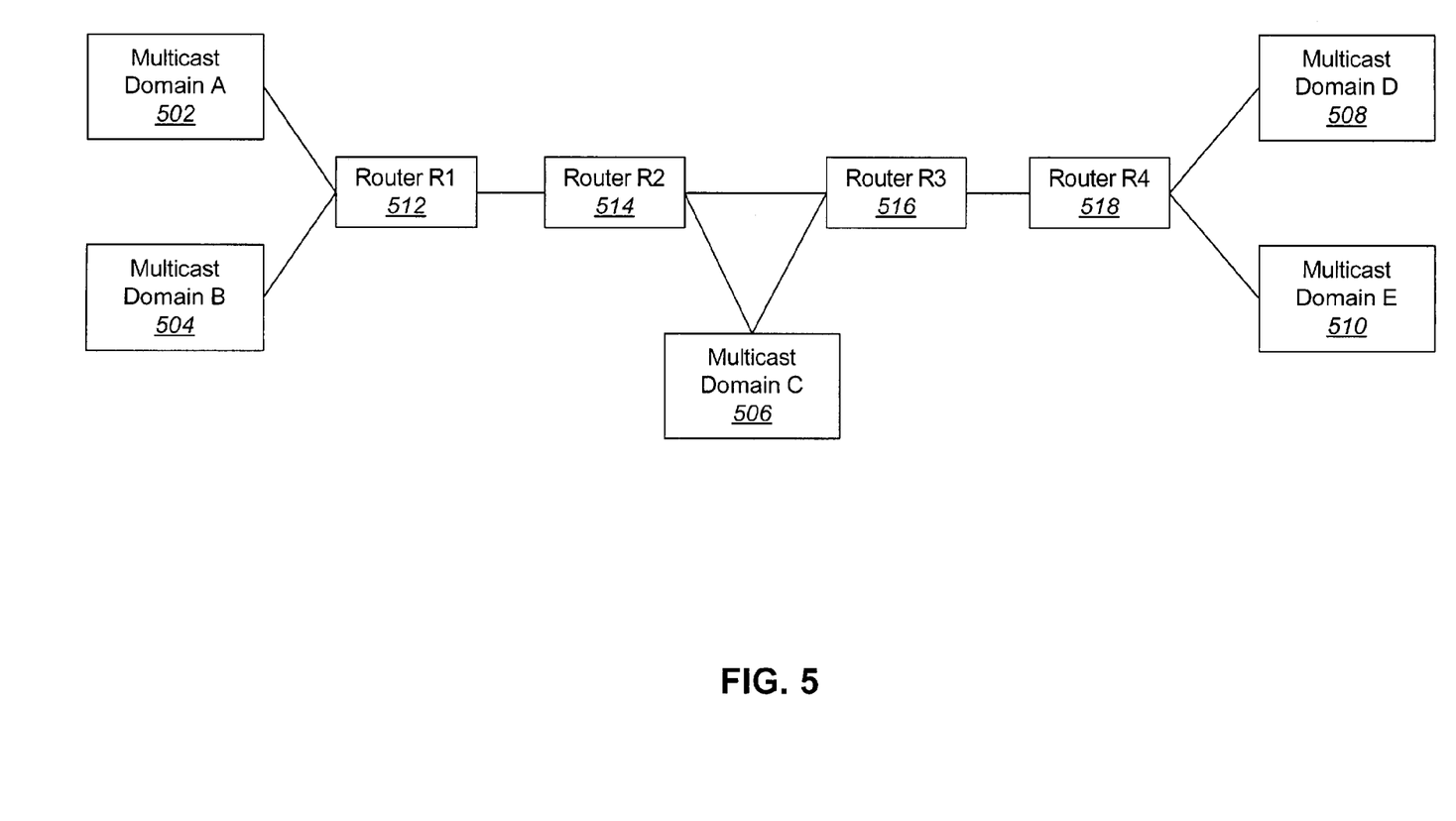
FIG. 5 is a diagram illustrating several multicast domains separated by various routers.

The following example in FIG. 5 illustrates one embodiment of a process for discovering the minimum spanning tree for a computer network. The diagram of FIG. 5 shows several multicast domains that are separated by various routers. In the diagram there are five multicast domains: A 502, B 504, C 506, D 508 and E 510. In the embodiment shown in FIG. 5, a multicast domain is defined as all computers/machines that can contact each other without crossing a router.

Figure 6:
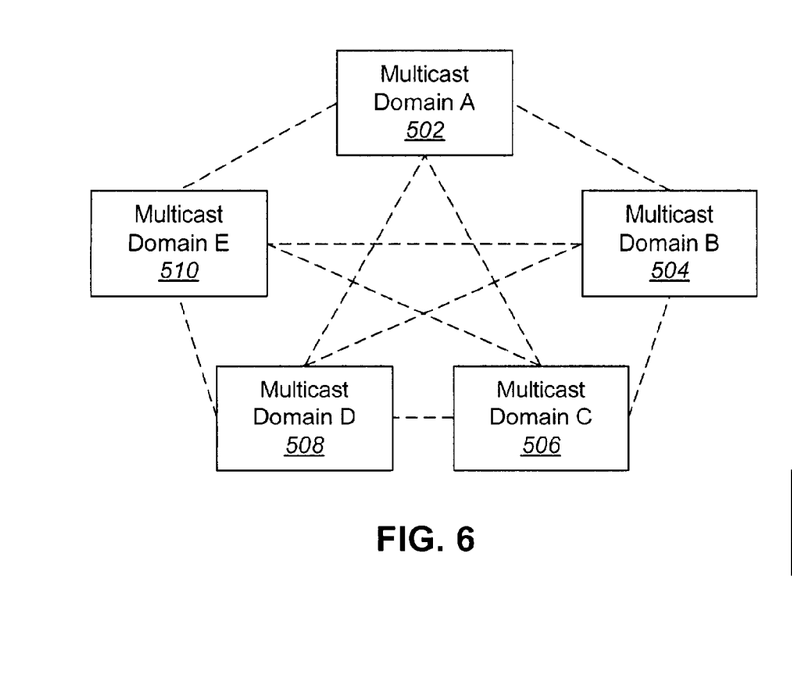
FIG. 6 is a network diagram illustrating a network topology assumption that may be made.

The routers R1 512, R2 514, R3 516, and R4 518 connect the multicast domains A 502, B 504, C 506, D 508 and E 510. Using the multicast domains the system will discover the minimum spanning tree for the network. The administrative system does not know what the topology of the network looks like, so it assumes that all alias domains might be fully connected as shown in FIG. 6. Although the administrative system is not explicitly shown in FIG. 5, the system is somewhere on the computer network.

On the first pass the administrative system will attempt to determine if a hop count of one exists for any of following alias domain-to-alias domain connections: A-B, A-C, A-D, A-E, B-C, B-D, B-E, C-D, C-E, and D-E. This may be accomplished by dividing the work between the various multicast domains. In this example there are 10 connections that are to be checked and 5 multicast domain representatives available, so each multicast domain representative may be assigned to check two of the connections. Of course, the work may be divided up in many different ways besides the example shown here.

The multicast domain representative can determine if the target multicast domain is within the specified hop count by using the time to live (TTL) field of the IP packet. The technique of determining if a specified machine is within a given hop count using the TTL field of an IP packet is well known in the art and those skilled in the art will recognize this concept from the traceroute program. One source of this algorithm is TCP/IP Illustrated, Volume 1 by W. Richard Stevens. (Although the multicast domain representatives are not explicitly shown in FIGS. 5 and 6, they are each somewhere within their respective multicast domains.) For example, the multicast domain representative in A is assigned to determine if multicast domains B and C are within one hop count. To determine this, it may send a UDP packet, or attempt a TCP connection, with a TTL of two to the multicast domain representative of both B and C. Since B is within one hop the multicast domain representative will respond to the UDP packet, or TCP connection request, and the multicast domain representative will know that the A-B connection is a one hop connection. The packet or connection request sent to C will have the TTL decremented to one by Router R1 and when the packet is processed by Router R2 the TTL will be decremented to zero and an ICMP host unreachable error will be sent to A, so A will know that A-C is not a one-hop connection.

As a result of the hop check performed by the multicast domains representatives the connections A-B and D-E will both be identified as connections with one hop count. Using this information and the modified Kruskal's algorithm a portion of the spanning tree is discovered.

Figure 7:
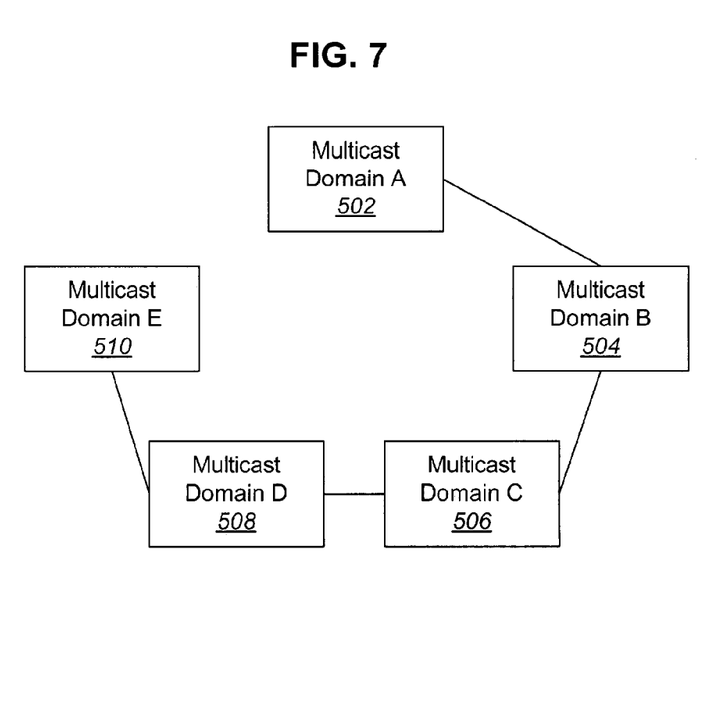
FIG. 7 is an example of a minimum spanning tree as determined by the exemplary systems and methods.

These edges will be added to the graph, and then the administrative system will attempt to determine if any of the following links A-C, A-D, A-E, B-C, B-D, B-E, C-D, and C-E have a hop count of two using the method outlined above. The result will be that A-C, B-C, C-D, and C-E are two hop counts. The results will be that B-C and C-D are added to the graph. The edges A-C and C-E are not added to the graph because they would create cycles, or loops in the graph. It should be noted that it is not important which of the edges are added, only that no cycles or loops are introduced into the graph. Adding these edges will result in a minimum spanning graph as shown in FIG. 7. Table 3 illustrates that only a portion of the total hop counts were calculated in this embodiment.

TABLE 3

| | A | B | C | D | E |
|---|---|---|---|---|---|
| A | . | 1 | 2 | ? | ? |
| B | . | . | 2 | ? | ? |
| C | . | . | . | 2 | 2 |
| D | . | . | . | . | 1 |
| E | . | . | . | . | . |

After the spanning tree has been discovered it is possible to use bandwidth characterizing technologies to determine the type of link. For example, the well known bandwidth ping algorithm can be used to establish a rough estimate of the bandwidth. This allows each edge to be characterized as being either a LAN or a WAN link.

Some of the features and methods described herein may have advantages over other existing solutions. Unlike existing spanning tree calculations the systems and methods herein do not need to discover all possible edge (or connection) values, it also has less edge values to calculate, and it is more efficient because the work is delegated to multicast alias domains.

The modified Kruskal's algorithm allows an iterative approach to be used in calculating the minimum spanning tree. This makes it is possible to discover the minimum spanning tree of the network to be without having to know all possible hop counts. In the above example the minimum spanning tree was discovered without having to know the hop count between the connections A-D, A-E, B-D, and B-E. When applied to larger networks an even more significant reduction in work may be accomplished.

Using multicast domains greatly reduces the number of edges, or connections, that need to be checked. This works because the minimum spanning tree is being built based upon the hop count and the all of the nodes in the multicast domain have a weight of zero, so how they are organized does not impact the weight of the overall minimum spanning tree.

Finally by delegating the work of actually discovering the hop counts to the individual multicast domain representatives reduces the work that must be done by the administrative system and provides for more efficient usage of network resources.

The present systems and methods features that may be used by system administrators in their work of managing distributed desktops. By being able to generate a minimum spanning tree the administrator has more knowledge about the connections between the nodes in the environment. Also by including the ability to determine if links are WAN or LAN the administrator can have an idea of the bandwidth available between links.

Having this information about the network will provide the administrator with detailed information about the network and provide for more intelligent replication of files. For example, using these embodiments it will be possible to determine the most efficient way to cascade a file through the system. Using the network shown earlier, a file could be replicated from A to B, then from B to C, then from C to D, and finally from D to E. This is more efficient than replicating the file from A to B, A to C, A to D, and the A to E, which is often done because of a lack of understanding of the network topology.

By using the multicast domains the number of nodes that need to be considered when determining the weight of the edges the effort is significantly reduced. Additionally the progressive discovery of hop counts reduces the total amount of network traffic that needs to be generated.

Figure 8:
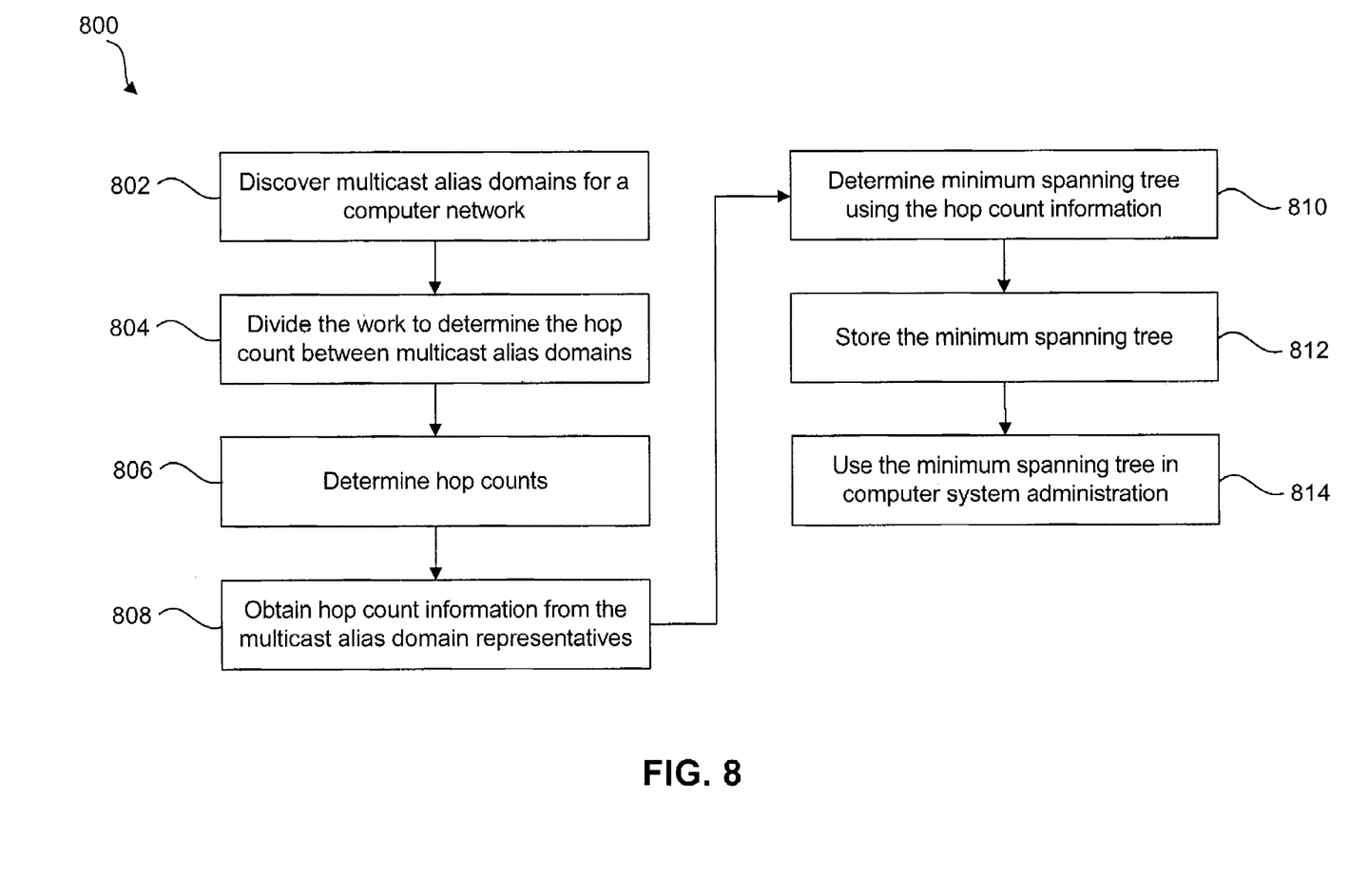
FIG. 8 is a flow diagram of a method for determining a minimum spanning tree for a computer network.

FIG. 8 is a flow diagram of a method for determining a minimum spanning tree for a computer network. Multicast alias domains are discovered 802 for a computer network. Then the work of determining the hop count between alias domains is divided 804 up among one or more computers, which are typically multicast domain representatives. The multicast alias domain representatives then determine 806 the hop count between the alias domains. Then the hop count information (one type of communication metric) is obtained 808 from the representatives.

A minimum spanning tree is determined 810 through use of the hop count information. An iterative algorithm is used for determining the spanning tree. A modified Kruskal's algorithm may be used in one embodiment of the method. The spanning tree that has been determined is then stored 812. The spanning tree may then be used 814 in computer system administration. System administrators may use spanning trees for a variety of tasks including, but not limited to, file transfer, data transfer, to present a graphical representation of a computer network through a graphical user interface, for analysis of a computer network, software updates, and the like.

Figure 9:
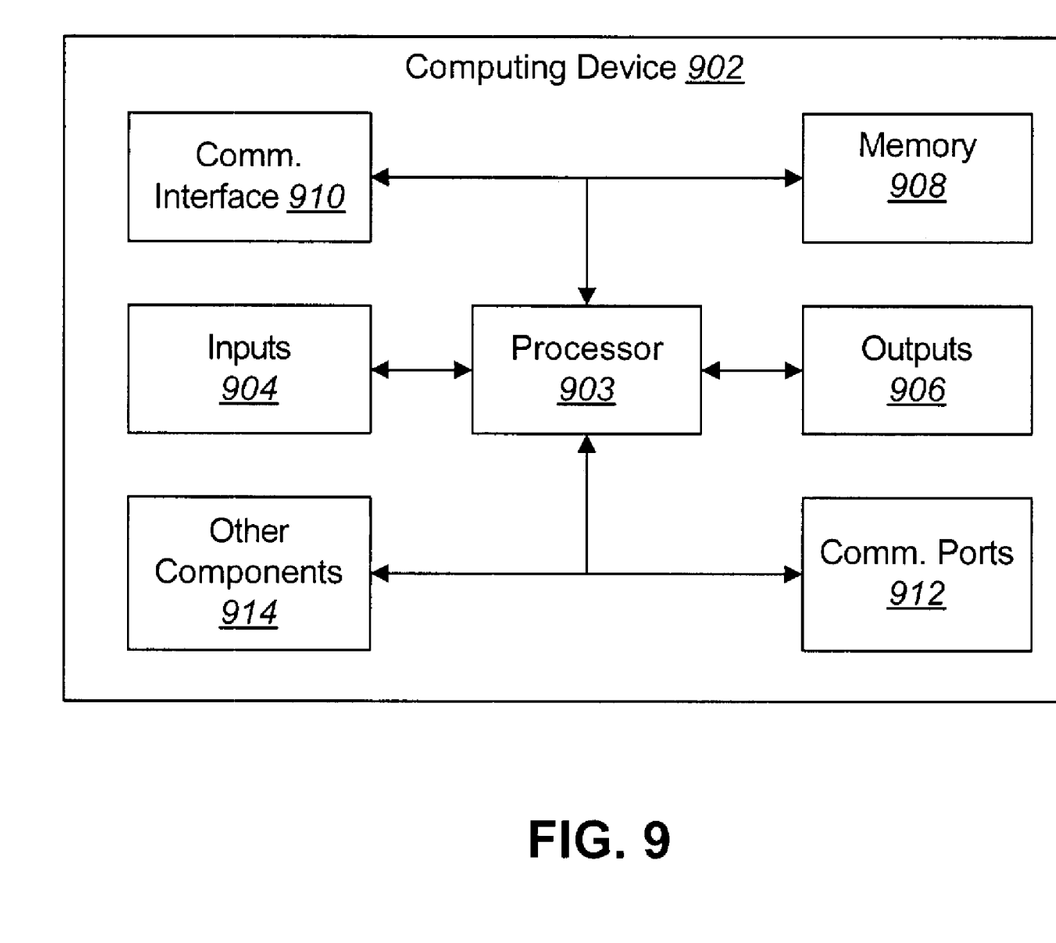
FIG. 9 is a block diagram illustrating the major hardware components typically utilized in a computing device.

FIG. 9 is a block diagram illustrating the major hardware components typically utilized in a computer or computing device used with embodiments herein. Computers and/or computing devices 902 are known in the art and are commercially available. The major hardware components typically utilized in a computing device 902 are illustrated in FIG. 9. A computing device 902 typically includes a processor 903 in electronic communication with input components or devices 904 and/or output components or devices 906. The processor 903 is operably connected to input 904 and/or output devices 906 capable of electronic communication with the processor 903, or, in other words, to devices capable of input and/or output in the form of an electrical signal. Embodiments of devices 902 may include the inputs 904, outputs 906 and the processor 903 within the same physical structure or in separate housings or structures.

The electronic device 902 may also include memory 908. The memory 908 may be a separate component from the processor 903, or it may be on-board memory 908 included in the same part as the processor 903. For example, microcontrollers often include a certain amount of on-board memory. The memory 908 may be embodied in RAM, a hard drive, a CD-ROM drive, a DVD-ROM drive, network storage, etc. The memory 908 is broadly defined as any electronic component capable of storing electronic information.

The processor 903 is also in electronic communication with a communication interface 910. The communication interface 910 may be used for communications with other devices 902. Thus, the communication interfaces 910 of the various devices 902 may be designed to communicate with each other to send signals or messages between the computing devices 902. A network card or wireless card may be used to implement a communication interface 910.

The computing device 902 may also include other communication ports 912. In addition, other components 914 may also be included in the electronic device 902.

Of course, those skilled in the art will appreciate the many kinds of different devices that may be used with embodiments herein. The computing device 902 may be a one-chip computer, such as a microcontroller, a one-board type of computer, such as a controller, a typical desktop computer, such as an IBM-PC compatible, a Personal Digital Assistant (PDA), a Unix-based workstation, a router, etc. Accordingly, the block diagram of FIG. 9 is only meant to illustrate typical components of a computer or computing device 902 and is not meant to limit the scope of embodiments disclosed herein.

FIG. 9 illustrates a computer system 902 that includes or is in electronic communication with a machine-readable medium (memory) on which is stored a set of instructions according to embodiments herein. Although described in the context of a computer system 902, the embodiments herein may be implemented in any suitable computer system comprising any suitable one or more integrated circuits.

Accordingly, computer system 900 includes or is in communication with a computer-readable medium on which is stored a set of instructions (i.e., software) embodying any one, or all, of the methodologies described above. For example, software can reside, completely or at least partially, within main memory and/or within processors 903. For the purposes of this specification, the term "computer-readable medium" shall be taken to include any mechanism that provides (i.e., stores and/or transmits) information in a form readable by a machine (e.g., a computer). For example, a computer-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for determining a spanning tree for a computer network, the method comprising:
    discovering multicast alias domains from the computer network, wherein multicast alias domains comprise a plurality of computing devices that see each other's multicast traffic without crossing a router;
    coordinating discovery of communication metrics by the multicast alias domains, wherein coordinating includes:
        dividing work for discovering the communication metrics between a plurality of multicast alias domains; and
        assigning the divided work for discovering the communication metrics to the plurality of multicast alias domains, wherein the communication metrics are between the multicast alias domains;
    obtaining the communication metrics from each of the plurality of multicast alias domains;
    constructing a spanning tree for the computer network by using the communication metrics;
    storing the spanning tree; and
    using the spanning tree in computer system administration.

2. The method of claim 1, wherein the communication metrics comprise hop counts.

3. The method of claim 2, wherein the spanning tree is a minimum spanning tree.

4. The method of claim 3, wherein the spanning tree was constructed for the computer network using an iterative algorithm.

5. The method of claim 4, wherein the iterative algorithm comprises a modified Kruskal's algorithm.

6. The method of claim 4, wherein using the spanning tree in computer system administration comprises transferring a file over the computer network.

7. The method of claim 4, wherein using the spanning tree in computer system administration comprises transferring data over the computer network.

8. The method of claim 4, wherein using the spanning tree in computer system administration comprises presenting a graphical representation of the computer network.

9. The method of claim 4, wherein using the spanning tree in computer system administration comprises analyzing the computer network.

10. The method of claim 4, wherein using the spanning tree in computer system administration comprises performing software updates.

11. A computer-readable medium for storing program data, wherein the program data comprises executable instructions to:
    discover multicast alias domains from the computer network, wherein multicast alias domains comprise a plurality of computing devices that see each other's multicast traffic without crossing a router;
    coordinate discovery of communication metrics by the multicast alias domains, wherein coordinating includes:
        dividing work for discovering the communication metrics between a plurality of multicast alias domains; and
        assigning the divided work for discovering the communication metrics to the plurality of multicast alias domains, wherein the communication metrics are between the multicast alias domains;
    obtain the communication metrics from each of the plurality of multicast alias domains;
    construct a spanning tree for the computer network by using the communication metrics; and
    store the spanning tree.

12. The computer-readable medium of claim 11, wherein the instructions are further executable to use the spanning tree in computer system administration.

13. The computer-readable medium of claim 11, wherein the communication metrics comprise hop counts.

14. The computer-readable medium of claim 11, wherein the spanning tree is a minimum spanning tree.

15. The computer-readable medium of claim 11, wherein the spanning tree was constructed for the computer network using a modified Kruskal's algorithm.

16. A system for determining a spanning tree for a computer network, the system comprising:

a computing device;

a computer-readable medium that is part of the computing device or in electronic communication with the computing device, the computer-readable medium comprising executable instructions to:

discover domains from the computer network, wherein domains comprise a plurality of computing devices that see each other's multicast traffic without crossing a router;

coordinate discovery of communication metrics by the domains, wherein coordinating includes:

dividing work for discovering the communication metrics between a plurality of domains; and assigning the divided work for discovering the communication metrics to the plurality of domains, wherein the communication metrics are between the domains;

obtain the communication metrics from each of the plurality of domains;

construct a minimum spanning tree for the computer network by using the communication metrics;

store the minimum spanning tree; and use the minimum spanning tree in computer system administration.

17. The system of claim 16, wherein the communication metrics comprise hop counts.

18. The system of claim 17, wherein the minimum spanning tree was constructed for the computer network using a modified Kruskal's algorithm.

19. The system of claim 16, wherein the instructions are further executable to use bandwidth characterizing technologies to determine link types in the computer network.

20. The system of claim 16, wherein the domains comprise multicast alias domains.

21. The system of claim 16, wherein the domains comprise multipoint communication domains.

22. The system of claim 16, wherein the domains comprise broadcast domains.

* * * * *